United States Patent
Meier et al.

(10) Patent No.: US 12,533,840 B2
(45) Date of Patent: *Jan. 27, 2026

(54) METHOD AND APPARATUS FOR FORMING PLASTIC PREFORMS INTO PLASTIC CONTAINERS WITH CONTROLLED RESERVOIR PRESSURE

(71) Applicant: KRONES AG, Neutraubling (DE)

(72) Inventors: Dominik Meier, Parsberg (DE); Benedikt Hengl, Essing (DE); Daniel Vogler, Neutraubling (DE); Markus Kulzer, Zell (DE)

(73) Assignee: KRONES AG, Neutraubling (DE)

( * ) Notice: Subject to any disclaimer, the term of this patent is extended or adjusted under 35 U.S.C. 154(b) by 167 days.

This patent is subject to a terminal disclaimer.

(21) Appl. No.: 18/244,102

(22) Filed: Sep. 8, 2023

(65) Prior Publication Data
US 2024/0083098 A1    Mar. 14, 2024

(30) Foreign Application Priority Data
Sep. 8, 2022 (DE) .................... 10 2022 122 880.0

(51) Int. Cl.
*B29C 49/78* (2006.01)
*B29C 49/18* (2006.01)
(Continued)

(52) U.S. Cl.
CPC ............ *B29C 49/783* (2013.01); *B29C 49/18* (2013.01); *B29C 49/42855* (2022.05); *B29C 2049/7832* (2022.05); *B29L 2031/7158* (2013.01)

(58) Field of Classification Search
CPC ........ B29C 49/42845; B29C 49/42855; B29C 49/783; B29C 49/18; B29C 2949/0715;
(Continued)

(56) References Cited

U.S. PATENT DOCUMENTS

| 9,339,969 B2 | 5/2016 | Asbrand et al. |
| 2004/0173949 A1 | 9/2004 | Storione et al. ............ 264/529 |

(Continued)

FOREIGN PATENT DOCUMENTS

| CN | 104228042 | 12/2014 | ............ B29C 49/28 |
| DE | 102004014653 | 10/2005 | ............ B29C 49/16 |

(Continued)

OTHER PUBLICATIONS

Search Report issued in German Patent Appln. Serial No. 10 2022 122 885.1, dated Apr. 12, 2023, with machine English translation, 12 pages.

(Continued)

*Primary Examiner* — Monica A Huson
(74) *Attorney, Agent, or Firm* — HAYES SOLOWAY P.C.

(57) ABSTRACT

A method for forming plastic preforms into plastic containers using at least one device for forming preforms into containers, wherein preforms are acted upon by a flowable and, in particular, gas-forming medium and are formed into the containers, wherein the preforms are acted upon with different pressure levels and the flowable medium is stored in at least two reservoirs and is supplied from these reservoirs to the preforms and at least one of these reservoirs is supplied with the flowable medium by a pressure supply device, wherein the target pressure in at least one reservoir is controlled, and wherein this target pressure is compared with an actual pressure in this reservoir. A value characteristic of this comparison is determined. An offset value is controlled on the basis of this value and is controlled in such a way that a predetermined pressure and the target pressure is set in the reservoir.

16 Claims, 3 Drawing Sheets

(51) Int. Cl.
*B29C 49/42* (2006.01)
*B29L 31/00* (2006.01)

(58) Field of Classification Search
CPC ............ B29C 49/36; B29C 2049/7832; B29C 2049/7833; B29L 2031/7158
See application file for complete search history.

(56) References Cited

U.S. PATENT DOCUMENTS

| | | | |
|---|---|---|---|
| 2008/0164642 A1 | 7/2008 | Hirdina | 264/528 |
| 2008/0191394 A1 | 8/2008 | Elliott | |
| 2009/0108505 A1 | 4/2009 | Steiner | 264/535 |
| 2010/0090375 A1 | 4/2010 | Geltinger et al. | |
| 2010/0171243 A1 | 7/2010 | Zoppas et al. | 264/529 |
| 2011/0057343 A1 | 3/2011 | Brunner et al. | 264/40.1 |
| 2011/0175246 A1 | 7/2011 | Winzinger | 264/40.1 |
| 2011/0260350 A1 | 10/2011 | Haesendonckx et al. | 264/40 |
| 2012/0227825 A1 | 9/2012 | Voth et al. | 137/14 |
| 2014/0110873 A1 | 4/2014 | Asbrand et al. | B29C 49/783 |
| 2016/0136868 A1 | 5/2016 | Haller | B29C 49/78 |
| 2016/0151957 A1 | 6/2016 | Wolfe et al. | |
| 2019/0315039 A1 | 10/2019 | Huettner et al. | B29C 49/06 |
| 2023/0100387 A1 | 3/2023 | Brunner et al. | |
| 2024/0083090 A1 | 3/2024 | Hengl et al. | |
| 2024/0083098 A1 | 3/2024 | Meier et al. | |
| 2024/0408808 A1* | 12/2024 | Kulzer | B29C 49/42845 |

FOREIGN PATENT DOCUMENTS

| | | | |
|---|---|---|---|
| DE | 102008034934 | 4/2009 | ............ B29C 49/78 |
| DE | 102009041013 | 3/2011 | ............ B29C 49/18 |
| DE | 102011110962 | 2/2013 | ............ B29C 49/42 |
| DE | 102012110023 | 4/2014 | ............ B29C 49/18 |
| DE | 102014116891 | 5/2016 | ............ B29C 49/78 |
| EP | 1175990 | 1/2002 | ............ B29C 49/78 |
| EP | 1974892 | 10/2008 | ............ B29C 49/78 |
| EP | 2345524 | 7/2011 | ............ B29C 49/78 |
| EP | 2441562 | 4/2012 | ............ B29C 49/42 |
| EP | 2497619 | 9/2012 | ............ B29C 49/42 |
| EP | 2352633 | 12/2012 | ............ B29C 49/78 |
| EP | 2722153 | 4/2014 | ............ B29C 49/78 |
| GB | 2431372 | 4/2007 | ............ B29C 49/18 |
| WO | 2007077241 | 7/2007 | ............ B29C 49/78 |
| WO | 2013023789 | 2/2013 | ............ B29C 49/16 |

OTHER PUBLICATIONS

Search Report issued in German Patent Appln. Serial No. 10 2022 122 880.0, dated Apr. 28, 2023, with machine English translation, 7 pages.
Search Report issued in German Patent Appln. Serial No. 10 2022 122 879.7, dated Mar. 14, 2023, with machine English translation, 11 pages.
Search Report issued in German Patent Appln. Serial No. 10 2022 122 883.5, dated Mar. 14, 2023, with machine English translation, 9 pages.
Search Report issued in German Patent Appln. Serial No. 10 2022 122 878.9, dated Apr. 13, 2023, with machine English translation, 10 pages.
U.S. Appl. No. 18/243,979, filed Sep. 8, 2023, Hengl et al.
U.S. Appl. No. 18/243,986, filed Sep. 8, 2023, Hengl et al.
U.S. Appl. No. 18/243,995, filed Sep. 8, 2023, Vogler et al.
U.S. Appl. No. 18/244,037, filed Sep. 8, 2023, Hengl et al.
Extended Search Report issued in EPO Patent Appln. Serial No. 23193133.8-1014, dated Feb. 5, 2024, with machine English translation, 8 pages.
Extended Search Report issued in EPO Patent Appln. Serial No. 23193217.9-1014, dated Feb. 22, 2024, with machine English translation, 19 pages.
Extended Search Report issued in EPO Patent Appln. Serial No. 23193185.8-1014, dated Feb. 5, 2024, with machine English translation, 8 pages.
Extended Search Report issued in EPO Patent Appln. Serial No. 23194549.4-1014, dated Feb. 7, 2024, with machine English translation, 9 pages.
Extended Search Report issued in EPO Patent Appln. Serial No. 23194845.6-1014, dated Feb. 9, 2024, with machine English translation, 8 pages.

* cited by examiner

METHOD AND APPARATUS FOR FORMING PLASTIC PREFORMS INTO PLASTIC CONTAINERS WITH CONTROLLED RESERVOIR PRESSURE

BACKGROUND OF THE INVENTION

The present invention relates to a method and an apparatus for forming plastic preforms into plastic containers. Such methods and apparatuses have long been known from the prior art. In this process, heated plastic preforms are usually expanded with a flowable medium and, in particular, with compressed air and thus formed into plastic containers and, in particular, plastic bottles. Compressed air reservoirs, such as annular ducts, are usually used for this purpose. The expansion of the plastic preforms usually takes place in several pressure stages, starting with a lower initial pressure via an increased intermediate blowing pressure and an even higher final blowing pressure.

In the prior art, the pressure levels of the blowing air reservoirs, for example blowing air annular ducts and, in particular, of the reservoirs for pre-blowing and intermediate blowing (hereinafter referred to as PI and PI+), are applied with fixed offset values, i.e. correction values, in order to achieve the pressure level exactly in a certain operating state. Preferably, these correction values are added to the set values.

In the state of the art, the problem sometimes arises that there are certain operating states in which the actual reservoir pressure, for example an actual annular duct pressure, deviates from a set value. This can occur in particular at low pressure levels (especially at pressures lower than 6 bar).

Furthermore, the correction value also partly depends on the preforms used or other parameters, such as BPHC (bottles per hour per cavity) and pressure. However, this means that the correction value is generally not a grade parameter. This means that the correction value is not always ideal for all operating conditions and also not all containers.

Furthermore, valuable recycling potential can remain unused during regular operation. In this way, air consumption is often significantly higher than it could be. In concrete examples, despite correct offset settings, pressure consumption was approx. 25% higher than it could theoretically be.

The object of the present invention is therefore based on the task of making such apparatuses for forming plastic preforms into plastic containers more efficient.

SUMMARY OF THE INVENTION

In a method according to the invention for forming plastic preforms into plastic containers by means of at least one device for forming plastic preforms into plastic containers, plastic preforms are acted upon by a flowable and, in particular, gaseous medium and thus formed into the plastic containers. In the method, the plastic preforms are subjected to different pressure levels and the flowable medium is stored in at least two reservoirs and fed from these (pressure) reservoirs to the plastic preforms. Furthermore, at least one of these reservoirs is supplied with the flowable medium by a pressure supply device and/or this flowable medium is made available to this pressure reservoir by a pressure supply device. Preferably, the set pressure in at least one reservoir is controlled and this set pressure is compared with an actual pressure in this reservoir, and a characteristic value for this comparison is determined.

According to the invention, an offset is controlled on the basis of this (characteristic) value and, in particular, is controlled in such a way that a predetermined pressure and, in particular, the set pressure is set in the reservoir.

Preferably, the pressure of the flowable medium in the reservoir and/or the supply of the flowable medium from the pressure supply device to the reservoir is also controlled and, in particular, controlled as a function of an operating state of the device. Preferably, the flowable medium is at least temporarily returned from the container to at least one pressure reservoir (this process is also referred to below as recycling). Preferably, however, the pressure in the reservoir is controlled indirectly by controlling the offset value.

By regulating the pressure in the reservoir, it is understood, in particular, that the supply of the gaseous medium from the pressure supply device to the reservoir becomes or is regulated.

In the prior art, there was no regulation of this pressure, but it was fixed, whereby sometimes a (fixed) offset was added to a certain set value of the pressure.

Particularly preferably, a pressure is supplied to the reservoir that is above a certain set value for this pressure. Thus, preferably, a certain offset is determined for the set value of a pressure in this reservoir and a corresponding value of the pressure added by this offset is given to the pressure reservoir. Preferably, this offset is variable and is particularly preferably controlled and particularly preferably regulated.

In the prior art, this offset is constant, as explained above. The invention now proposes to control and preferably regulate this offset, and particularly preferably, to regulate it as a function of different operating conditions. In this way, a more flexible adaptation of method conditions is possible and thus also a higher energy saving. The pressure supply device can preferably be a compressor, but also for example, a pressure connection in a factory hall. Particularly preferably, the supply of pressure is controlled by means of a control device. This can be, for example, a so-called dome pressure regulator.

Preferably, at least two operating states of the device are defined and the offset is controlled as a function of different operating states. Preferably, the pressure in the reservoir is controlled differently in these two operating states. For example, one operating state may be a working state in which plastic preforms are expanded to form the containers.

In a preferred embodiment of the method, the offset in the respective operating states is controlled in such a way that the target pressure in the reservoir is constant over all operating states. By constant, it is understood that deviations over time are less than 20%, preferably less than 15%, preferably less than 10%, preferably less than 5% and particularly preferably, less than 3%. A first operating state is preferably a state in which no compressed air is taken from the reservoir (no bottle is blown) and a second operating state is preferably a state in which compressed air is taken from the reservoir (a bottle is blown). A third operating state is preferably a state in which a portion of the flowable medium is at least temporarily recycled into the reservoir from another reservoir and/or from the container to be expanded.

Preferably, at least a third pressure reservoir is also provided, which can store the flowable medium under a certain pressure. Preferably, a pressure of the flowable medium in this third reservoir differs from the pressures in the first and second pressure reservoirs. Particularly preferably, the flowable medium is compressed air.

In a further preferred embodiment of the method, the actual pressure is measured by means of a pressure measuring device and, in particular, a pressure measuring device arranged in the reservoir. Preferably, the actual pressure is measured continuously. However, it would also be conceivable to measure the actual pressure intermittently, for example, at predetermined time intervals. A pressure measurement in a connection line to the reservoir would also be conceivable or several distributed pressure measuring devices.

In a further preferred embodiment of the method, the reservoir is filled with the flowable medium in at least one operating state and, in the process, a pressure of the flowable medium is controlled and preferably iteratively controlled to a target pressure and/or set pressure. The amount of the iteration steps is preferably variable or a fixed value. Preferably, the flowable medium is filled with the flowable medium in several operating states and preferably in all operating states, and a pressure of the flowable medium is thereby controlled and preferably iteratively controlled to a target pressure and/or set pressure. Thus it is possible that first the pressure is adjusted to a certain value and then in a plurality of steps to the desired target pressure, whereby this target pressure can be the above-mentioned target pressure, but also the target pressure to which a certain offset is added.

This makes it possible that in a first operating state, for example, a situation in which the apparatus has been switched on, a controller approaches a target pressure and preferably approaches a target pressure unilaterally. For example, an initial pressure value can be set first, e.g. 80% of the step value or target pressure, and then the pressure can ideally be increased until the target pressure and the actual pressure are equal. Preferably, this operating state is a commissioning state in which a working operation of the apparatus is prepared.

In a second operating situation, the (pressure) reservoir or an annular duct acting as a reservoir is filled. The first plastic preforms enter the device, for example, a blowing wheel with a plurality of forming stations. The production can start here without any compressed air recycling or so-called "air wizards (AW)". As soon as the first container or the first plastic preform enters the blowing wheel, a valve device, such as a proportional valve, can react with a further step response. This offset (to the current set pressure) is preferably stored in a machine control with a variable (for example X).

During operation, the valve device is then preferably controlled like a proportional valve and especially preferably continuously. In this way, this variable X can preferably change. When the device changes to a control mode, in which, for example, recycling takes place, or when the last container leaves the blowing wheel before an operating stop, the last known offset value is preferably written back into the output variable X. Preferably, a further operating state is therefore an operating state in which plastic preforms are expanded but in which compressed air is also recycled.

Preferably, when the device is restarted, the value X (from the memory) is read out and added to the current target value. Compared to the state of the art, this value X is what it is in the state of the art, the offset, but with the difference that this offset value is variable and can be adjusted. Thus, this value X is a kind of correction value, which is supplied to the operating state as described here but which is only used for restarting and can otherwise be changed by a control system and, in particular, a regulation system.

In a further situation, for example, in the transition from production without recycling to regular operation with recycling, a further adjustment of the pressure in the reservoir can take place. As soon as the first container or the first plastic preform enters a recycling phase, the respective (pressure) reservoir preferably enters a recycling control mode. A change of state can occur in a steady-state process and can also occur abruptly.

Variables stored in the control system can be used here, for example YN and ZN. These variables YN and ZN, like the value X described above, are preferably invisible and non-editable type parameters that are set for each pressure reservoir that is to be recycled (for example YP1, YPi, YPi+, ZP1, ZPi, ZPi+). Preferably, the value YN is credited to the respective valve device or the respective proportional valve when reading in. In this case, the value YN replaces the previously valid value X) and ZN represents a control variable of the associated recycling control loop. In this way, an automatic restart is described.

In the case of new methods, it is necessary for the air recovery to regulate itself first. In this case, after the situation 2 or the operating state described above, there is no sudden change, but an iterative learning phase. Because both a control loop for a proportional valve and a control loop for the recycling refer to the same measured variable (the actual pressure in the pressure reservoir), one of the two actuators is preferably controlled. It makes sense to use the proportional valve for this purpose.

During the transition to the recycling mode, the current manipulated variable of the proportional valve (setpoint value+X) is controlled by a predetermined value, for example −0.3 bar (preferably a value between −0.1 and −0.8) and preferably controlled downwards. As a result, the annular duct pressure drops slightly. A recycling regulator preferably becomes active and reacts, in particular, immediately with an increase in the recycling period.

An annular duct pressure preferably equalizes again to the target pressure level. This process is then preferably repeated several times, in particular, until the lowering of the proportional valve once or twice in succession has no longer led to a further pressure drop.

In addition, it would also be possible to evaluate a blowing curve, for example via a gradient triangle. These once or twice in succession are advantageous so that a device, such as a dome pressure regulator, remains present as a fallback level if, for example, a container bursts or other leakages disturb the blowing process.

In a further preferred embodiment (which may also be an operating condition), a gross leakage is present in one of the above situations (for example, a hose burst). In these cases, a plausibility check is preferably carried out so that a proportional valve does not regulate upwards without limits. As an example, differences or pressures in a certain order of magnitude, for example 3-5 bar, could be taken as a basis here.

In a further preferred embodiment of the method, the characteristic value for the comparison is a difference or a ratio of the pressures. In particular, a difference between actual pressure and target pressure or vice versa, or also a ratio.

In a further preferred embodiment of the method, the pressure in the pressure reservoir is brought to a predetermined pressure level. Preferably, the pressure in the reservoir should be constant.

Preferably, this control and regulation is carried out by means of a valve device and, in particular, a proportional valve. Therefore, the pressure may fluctuate. Particularly preferably, the pressure and/or the offset is controlled within predetermined limits, for example within limits of +/−30%, preferably +/−20%, preferably +/−10%. Continuous control and/or regulation of this pressure is particularly preferred. In this way, the above-mentioned offset is preferably adapted to an operating situation.

Particularly preferably, the pressure in the reservoir is regulated by means of a so-called dome pressure regulator. This can be connected between the pressure supply device and the respective pressure reservoir. In a preferred embodiment, the flowable medium is distributed to the pressure reservoir or reservoirs by means of a distribution device and, in particular, by means of a rotary distributor and/or pressurized with it.

Particularly preferably, at least from time to time, a portion of the flowable medium is recycled from one reservoir and/or the container to be expanded into another (pressure) reservoir or is (re)fed into it. Particularly preferably, there are several reservoirs and recycling takes place in this operating state.

In a further preferred embodiment of the method, the pressure providing device is controlled with respect to the amount of pressure it provides and/or the pressure provided by the pressure providing device is reduced to the respective reservoir pressure by a reducing station.

In a further preferred embodiment of the method, the reducing station uses a control member and an actuator, wherein the actuator controls the control member to regulate a set pressure in the reservoir, wherein, in particular, the control member is a dome pressure regulator and/or, in particular, the actuator is a proportional valve.

Particularly preferably, the method described above is carried out with the following method steps. First, the flowable medium is fed into the reservoir up to a predetermined initial pressure. Then the pressure is increased to a value that is above a set pressure. Particularly preferably, a further increase of the pressure takes place at or before the start of the forming process or the working operation.

In a further preferred embodiment of the method, the pressure in the reservoir is lowered again at a later time and, particularly preferably, is lowered in steps. In this way, it is possible for the pressure to be returned to approximately the set value or also to the set value in later operation.

The present invention is further directed to an apparatus for forming plastic preforms into plastic containers, having at least one forming station which, by means of a pressurizing device, pressurizes plastic preforms with a flowable and, in particular, gaseous medium and thus forms them into the plastic containers and, in particular, expands them.

In this case, the forming station is suitable and intended for subjecting the plastic preforms to different pressure levels, the device having at least a first (pressure) reservoir for storing the flowable medium under a first pressure and a second (pressure) reservoir for storing the flowable medium under a second pressure (the first and second pressures preferably being different), and furthermore at least one feed device being provided, which feeds the flowable medium from these reservoirs to the plastic preforms. Furthermore, the device has a pressure supply device, which supplies at least one of these reservoirs with the flowable medium. In this case, the set pressure in at least one reservoir can be controlled, and this set pressure can be compared with an actual pressure in this reservoir, and a value characteristic of this comparison can be determined.

According to the invention, the pressure output by the pressure supply device is controllable and/or the device comprises a reducing station, which regulates the pressure supplied by the pressure supply device to said reservoir.

Preferably, the apparatus may also comprise a control device, which regulates the pressure supplied by the pressure supply device to said reservoir and/or the supply of the flowable medium from the pressure supply device to the reservoir. In particular, this control device is suitable and intended to control and/or regulate the first reservoir with the first pressure and/or the pressure to the first reservoir in which the lowest pressure is stored.

Preferably, the apparatus comprises a movable and, in particular, a rotatable carrier. Particularly preferably, several forming stations are arranged on this carrier. These preferably each have blow molds within which the forming takes place.

Particularly preferably, a valve device, and in particular a valve block, is associated with each forming station, which in turn has a plurality of valves in order to apply different pressures to the plastic preforms. Preferably, each forming station also has a stretching bar, which can be inserted into the plastic preforms in order to stretch them in their longitudinal direction. Preferably, several supply lines are provided, which connect several reservoirs with the forming stations and, in particular, with the valve devices.

Particularly preferably, a distribution device is provided, which distributes the flowable medium provided by the pressure supply device to the individual reservoirs and thus ultimately also to the individual forming stations. Particularly preferably, the pressure supply device is of stationary design.

Particularly preferably, the apparatus also has at least a third pressure reservoir and preferably also at least a fourth pressure reservoir. Particularly preferably, at least one of these pressure reservoirs and preferably several pressure reservoirs are designed as annular ducts, which are arranged in particular on the above-mentioned rotatable carrier.

Particularly preferably, the control device controls and, in particular, regulates the pressure supplied to the reservoir as a function of an operating state of the device. This has been described in more detail above.

Particularly preferably, the flowable medium can be (re) guided at least temporarily from the container to be expanded or a second reservoir to the first reservoir. In this way, compressed air recycling can take place. Particularly preferably, at least one and preferably a plurality of valves are provided for carrying out this recycling.

In a preferred embodiment, the reducing station has a control element and an actuator, the control element preferably being a dome pressure regulator and/or the actuator being a proportional valve.

Particularly preferably, at least one reservoir and preferably several reservoirs are designed as annular ducts.

In a further preferred embodiment, the forming station has a valve arrangement with a plurality of valves to apply the different pressure levels to the reservoirs. Particularly preferably, at least one of these valves is a proportional valve.

Particularly preferably, the apparatus comprises at least one sensor device and, in particular, a pressure measuring device, which is associated with at least one pressure reservoir. Particularly preferably, this sensor device is suitable and intended for continuously determining a pressure within the reservoir. In a further preferred embodiment, the apparatus also comprises a sensor device, which detects and, particularly preferably, continuously detects the pressure provided by the pressure provision device.

Particularly preferably, the control device is adapted to control the pressure taking into account a target pressure and preferably to add an offset pressure, and in particular, a variable offset pressure, to this target pressure.

In a further preferred embodiment, the apparatus has a comparison device, which is suitable for comparing a set pressure in a reservoir with an actual pressure in this reservoir and for outputting a value characteristic of this comparison, and preferably, a control device controls the pressure in this reservoir on the basis of this characteristic value. Particularly preferably, the offset (difference between the set pressure and the actual pressure in the reservoir) is controlled in such a way that the set pressure in the reservoir is constant.

BRIEF DESCRIPTION OF THE INVENTION

Further advantages and embodiments can be seen in the accompanying drawings:

DETAILED DESCRIPTION OF THE INVENTION

Figure 1:
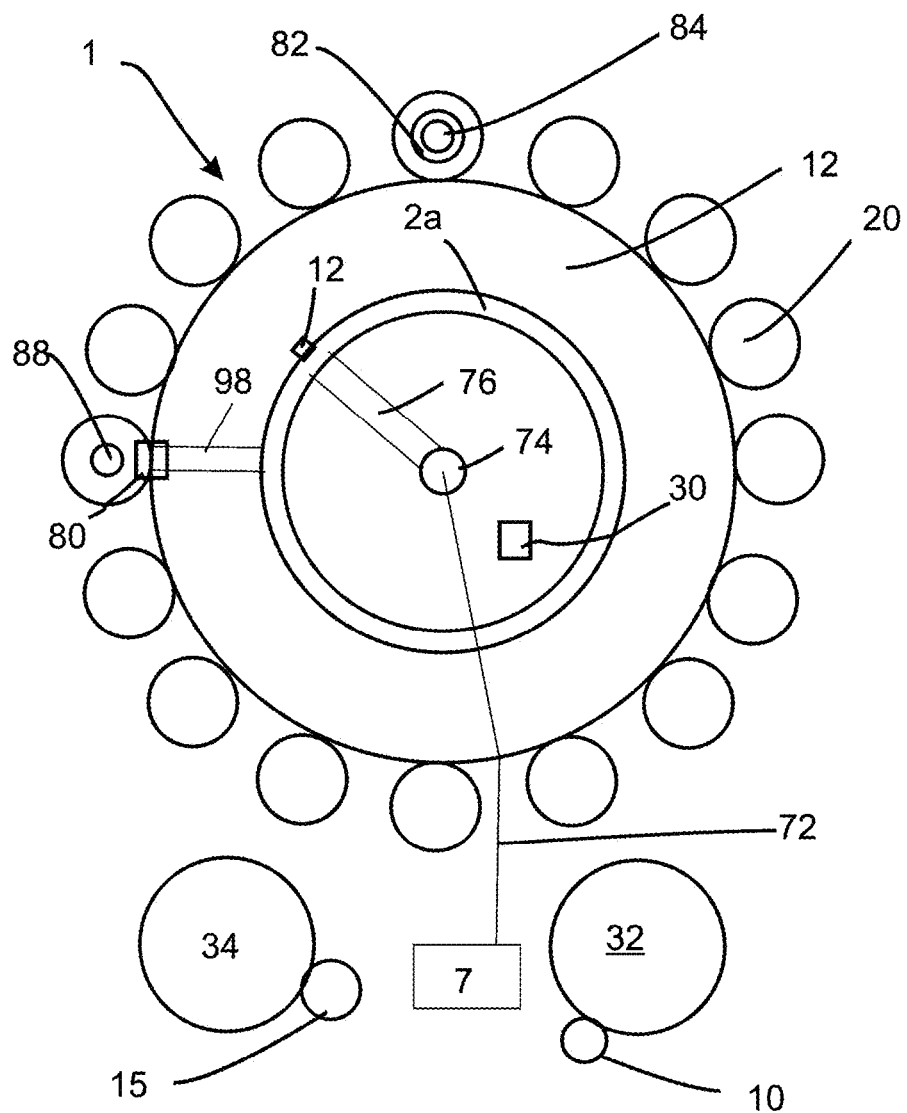
FIG. 1 shows a schematic view of an apparatus according to the invention.

FIG. 1 shows an apparatus 1 for forming plastic preforms 10 into plastic containers 15. Such a device has a rotatable carrier 12 on which a large number of forming stations 20 is arranged. Such individual forming stations each have blow molds 82 that form a cavity inside them for expanding the plastic preforms.

Reference sign 84 denotes an application device, which is used to expand the plastic preforms 10. This can be a blow nozzle, for example, which can be applied to a mouth of the plastic preforms in order to expand the latter. Reference sign 80 denotes a valve arrangement, such as a valve block, which has a large number of valves that control the application of different pressure levels to the plastic preforms.

In a preferred embodiment of the method, first a pre-blowing pressure P1, then one intermediate blowing pressure Pi that is higher than the pre-blowing pressure, and finally a final blow molding pressure P2 that is higher than the intermediate blowing pressure Pi are applied to the plastic preforms. After expansion of the plastic containers, the pressures or compressed air are preferably returned from the container to the individual pressure reservoirs.

Reference sign 88 denotes a stretching rod used to stretch the plastic preforms in their longitudinal direction. Preferably, all forming stations have such blow molds 82 along with stretching rods 88. The number of these forming stations is preferably between 2 and 100, preferably between 4 and 60, preferably between 6 and 40.

The plastic preforms 10 are fed to the apparatus via a first transport device 32, such as, in particular but not exclusively, a transport star. The plastic containers 15 are transported away via a second transport device 34.

Reference sign 7 denotes a pressure supply device, such as a compressor or also a compressed-air connection. The compressed air is conveyed via a connecting line 72 to a rotary distributor 74, which gives it via a further line 76 to the reservoir 2a, which in this case is an annular channel.

In addition to such annular channel 2a shown, further annular channels are preferably provided, which are, however, concealed by, e.g., lie underneath, the annular channel 2a in the illustration shown in FIG. 1. Reference sign 98 denotes a connecting line that delivers the compressed air to a forming station 20 or the valve block 90 thereof. Preferably, each of the annular channels is connected to all forming stations via corresponding connecting lines.

Figure 2:
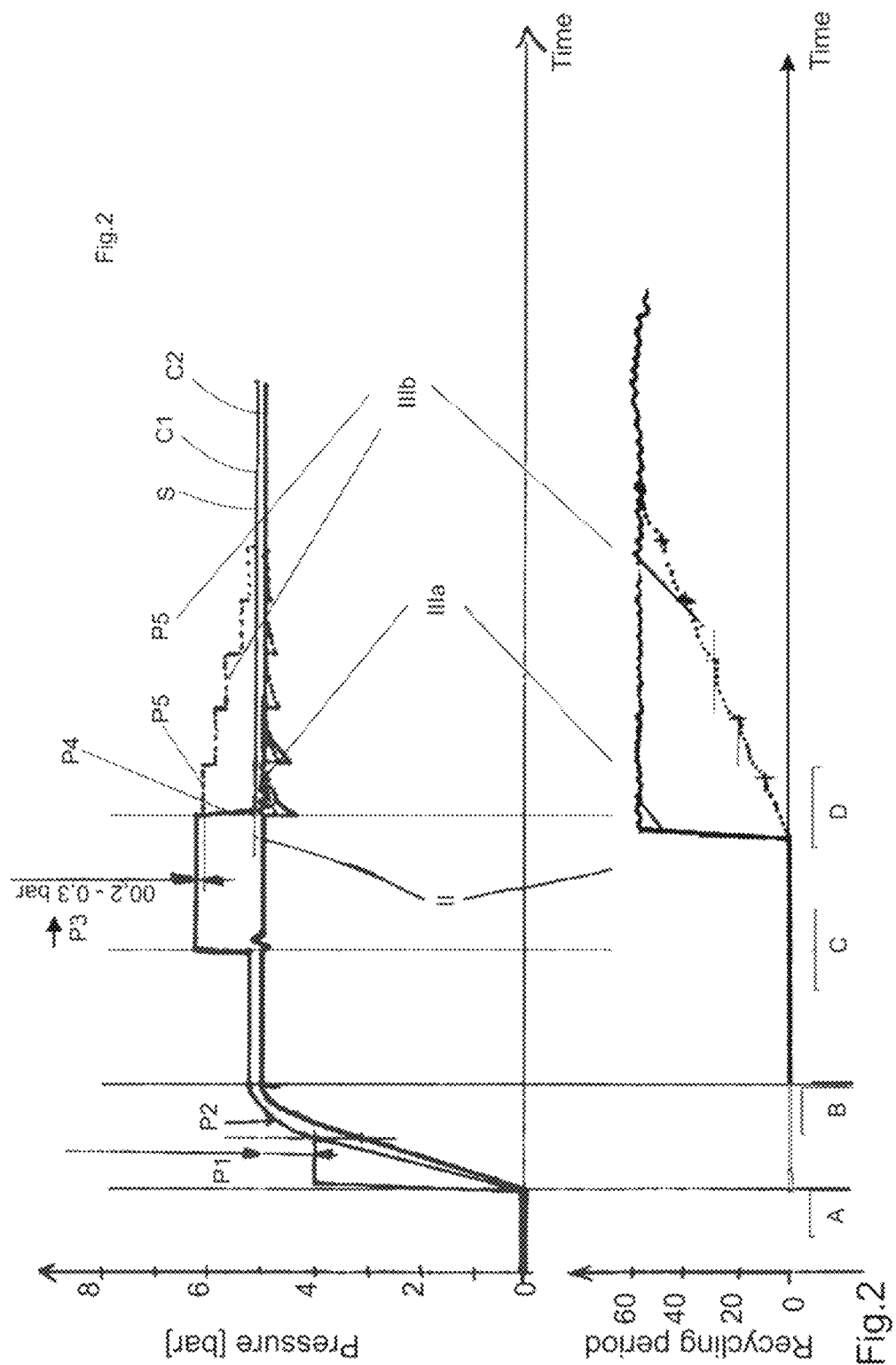
FIG. 2 shows a view of a pressure profile to illustrate the invention.

FIG. 2 shows a diagram illustrating the pressure setting at the first pressure reservoir 2a, which is preferably used to apply the pre-blowing pressure P1 to the plastic preforms. Here, the time is plotted on the coordinate and the (reservoir) pressure in bar is plotted on the coordinate in the upper diagram and a duration of a recycling is plotted on the lower diagram.

The reference sign I indicates a starting value of the pressure, i.e. the value of the pressure with which the pressure reservoir is initially pressurized. Here (cf. curve C1) the pressure is first set to an initial value (P1) and then iteratively (arrow P2) a target value is approached. It can be seen that this target value is somewhat higher than the desired target value S2 for the compressed air reservoir (curve C2). In an operating state 2, in which the first reservoir has entered the system, the pressure is increased (arrow P3) up to and maintained for a predetermined period of time (arrow P3). The pressure is then gradually lowered in a teach-in phase P5. In this phase, the last set pressure value is stored. Preferably, an additive offset of the pressure is changed or adjusted here.

The reference sign A indicates an operating state (in particular, its time period) in which the machine is still off. At time period B, the machine is switched on and the console or the print reservoirs are ventilated. At time C, the first plastic preform is at the blowing wheel and working operation begins. From time D, the first bottle or the process is in recycling mode. In this phase, as mentioned above, the pressure is again gradually adjusted to the target pressure S. In this operating state, the reference sign IIIb indicates a teach-in phase in which the pressure is adjusted, for example, to the control variable for the recycling shown in the lower part of the figure. Accordingly, the length of the recycling period also increases during this period.

Figure 3:
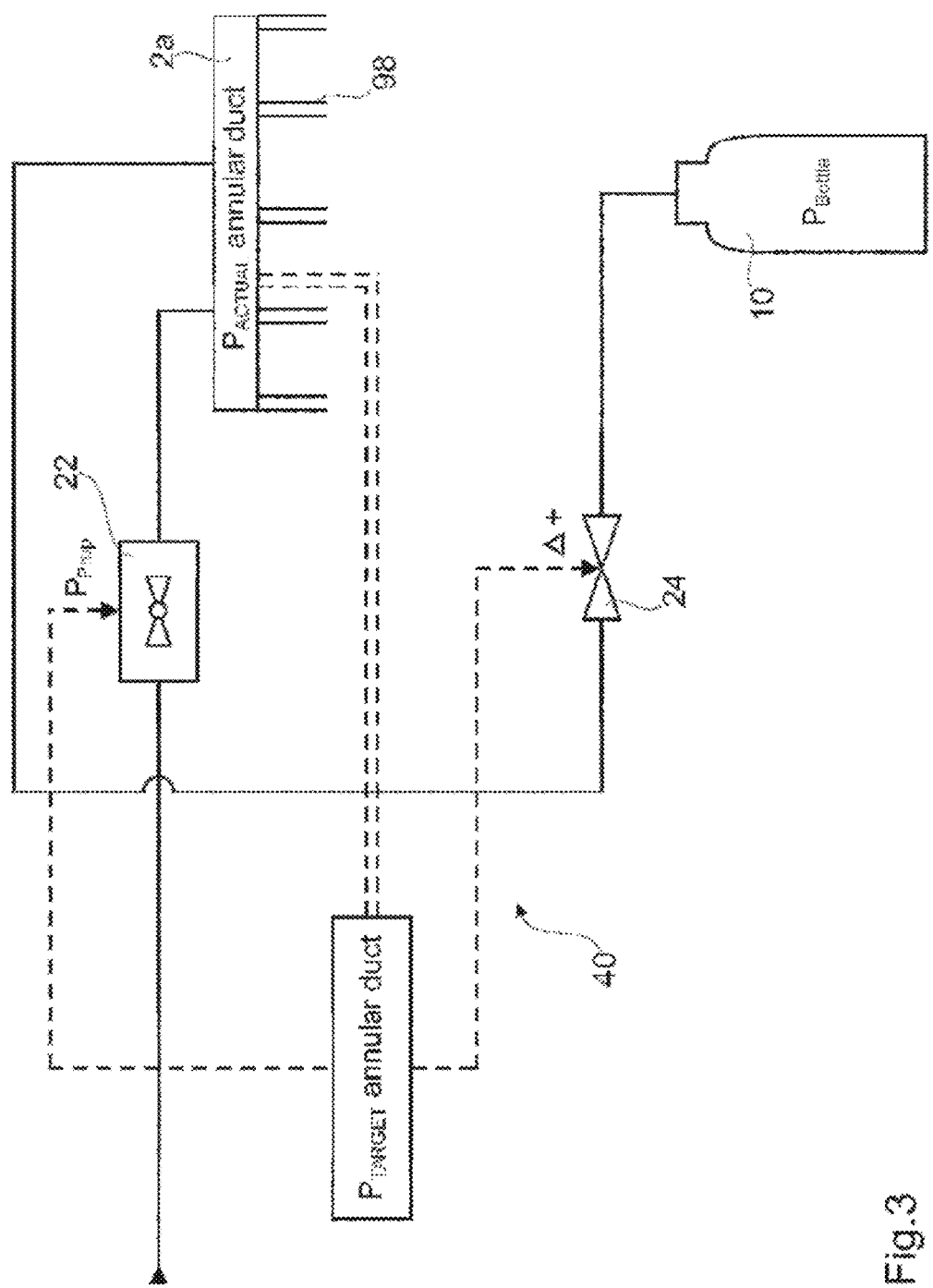
FIG. 3 shows a schematic view of the method according to the invention.

FIG. 3 shows a diagram illustrating the operation of the invention. The pressure reservoir 2a is shown here, in which a pressure P-target is present to which a certain actual pressure is present. Advantageously, this is an annular duct. The pressure Pactual in the reservoir 2a is controlled via a control circuit 40, which contains a proportional valve 22. This is done by balancing the pressure in this annular duct with a Ptarget pressure.

From the pressure reservoir 2a, the air finally reaches the container in which the pressure PF prevails via a valve 24. Starting from this container, recycling is also possible by controlling the valve, whereby air pressure is led back into the annular duct or reservoir 2a.

The applicant reserves the right to claim all features disclosed in the application documents as essential to the invention, provided that they are novel over the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

The invention claimed is:

1. A method for forming plastic preforms into plastic containers using at least one device for forming plastic preforms into plastic containers, wherein plastic preforms are acted upon by a flowable medium and are thus formed into the plastic containers, wherein the plastic preforms are acted upon with different pressure levels and the flowable medium is stored in at least two reservoirs and is supplied from these reservoirs to the plastic preforms and wherein at least one of these reservoirs is supplied with the flowable medium by a pressure supply device,
wherein the target pressure in at least one reservoir is controlled,
and wherein this target pressure is compared with an actual pressure in this reservoir, and a value characteristic of this comparison is determined,
wherein
an offset value is controlled using the characteristic value of the comparison and is controlled in such a way that a predetermined pressure is set in the reservoir.

2. The method according to claim 1,
wherein
at least two operating states for the device are defined, wherein the offset is controlled depending on different operating states.

3. The method according to claim 2,
wherein
the offset in the respective operating states is controlled in such a way that the target pressure in the reservoir is constant over all operating states.

4. The method according to claim 1,
wherein
the actual pressure is measured using a pressure measuring device and a pressure measuring device arranged in the reservoir.

5. The method according to claim 1,
wherein
in at least one operating state, the reservoir is filled with the flowable medium and a pressure of the flowable medium is controlled in the process.

6. The method according to claim 1,
wherein
the characteristic value of the comparison is a difference or ratio of the pressures.

7. The method according to claim 6,
wherein
the pressure in the reservoir is regulated using a dome pressure regulator.

8. The method according to claim 1,
wherein
a portion of the flowable medium is recycled from one reservoir and/or the container to be expanded into another reservoir, at least temporarily.

9. The method according to claim 1,
wherein
the pressure supply device is controlled with regard to the amount of pressure it outputs and/or the pressure provided by the pressure supply device is reduced to the respective reservoir pressure by a reducing station.

10. The method according to claim 9,
wherein
the reducing station uses a control member and an actuator,
wherein the actuator controls the regulating member to regulate a target pressure in the reservoir, wherein the regulating member is a dome pressure regulator and/or the actuator is a proportional valve.

11. An apparatus for forming plastic preforms into plastic containers, having at least one forming station, configured to apply a flowable medium to plastic preforms using an application device and thus form the plastic preforms into the plastic containers, with the forming station applying different pressure levels to the plastic preforms, wherein the device comprises at least a first reservoir configured for storing the flowable medium under a first pressure and a second reservoir configured for storing the flowable medium under a second pressure and at least one supply device is provided, which supplies the flowable medium from these reservoirs to the plastic preforms and further a pressure supply device is provided, configured for supplying at least one of the reservoirs with the flowable medium,
wherein the target pressure in at least one reservoir is controllable,
and wherein the target pressure is compared with an actual pressure in this reservoir, and a value characteristic of this comparison is determined,
wherein
the pressure output by the pressure supply device is controllable and/or the apparatus comprises a reducing station, configured to regulate the pressure supplied by the pressure supply device to said reservoir.

12. The apparatus according to claim 11,
wherein
the flowable medium is guided from the container to be expanded or the second reservoir into the first reservoir, at least temporarily.

13. The apparatus according to claim 11,
wherein
the reducing station has a control element and an actuator.

14. The apparatus according to claim 11,
wherein
at least one reservoir is designed as an annular duct.

15. The apparatus according to claim 11,
wherein
the forming station has a valve arrangement with a plurality of valves configured to apply different pressure levels to the containers.

16. The apparatus according to claim 11,
wherein
the apparatus comprises a comparison device adapted to compare a set pressure in a reservoir with an actual pressure in said reservoir and a value characteristic of said comparison.

* * * * *